(12) United States Patent
Williams et al.

(10) Patent No.: US 8,499,044 B2
(45) Date of Patent: Jul. 30, 2013

(54) FORMATTED MESSAGE PROCESSING UTILIZING A MESSAGE MAP

(75) Inventors: Roy Williams, Woodinville, WA (US); Oleg V. Ouliankine, Redmond, WA (US); Yuriy M. Inglikov, Redmond, WA (US); Nelly L. Porter, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1397 days.

(21) Appl. No.: 11/567,921

(22) Filed: Dec. 7, 2006

(65) Prior Publication Data

US 2008/0140783 A1    Jun. 12, 2008

(51) Int. Cl.
*G06F 15/16* (2006.01)

(52) U.S. Cl.
USPC .......................................... 709/206

(58) Field of Classification Search
USPC ................ 709/200, 217, 218, 219, 224, 228, 709/236, 246, 201–206
See application file for complete search history.

(56) References Cited

U.S. PATENT DOCUMENTS

| | | | | |
|---|---|---|---|---|
| 5,931,904 A | 8/1999 | Banga et al. | ................. | 709/217 |
| 6,378,015 B1 | 4/2002 | Yen | | |
| 6,606,642 B2 * | 8/2003 | Ambler et al. | ................ | 709/200 |
| 6,629,127 B1 * | 9/2003 | Deen et al. | .................... | 709/203 |
| 7,072,983 B1 * | 7/2006 | Kanai et al. | ................... | 709/246 |
| 7,072,984 B1 | 7/2006 | Polonsky et al. | ............. | 709/246 |
| 7,131,116 B1 | 10/2006 | Krishna | | |
| 7,512,658 B2 * | 3/2009 | Brown et al. | ................. | 709/206 |
| 7,606,267 B2 * | 10/2009 | Ho et al. | ........................ | 370/477 |
| 8,112,482 B1 * | 2/2012 | Geddes | .......................... | 709/206 |
| 2001/0029548 A1 * | 10/2001 | Srikantan et al. | ............. | 709/250 |
| 2003/0055907 A1 | 3/2003 | Stiers | ............................ | 709/206 |
| 2003/0078890 A1 | 4/2003 | Schmidt et al. | | |
| 2003/0167317 A1 * | 9/2003 | Deen et al. | ..................... | 709/219 |
| 2003/0188009 A1 | 10/2003 | Agarwalla et al. | ............. | 709/236 |
| 2004/0064647 A1 | 4/2004 | DeWhitt et al. | | |

(Continued)

FOREIGN PATENT DOCUMENTS

| | | |
|---|---|---|
| CN | 1374614 A | 10/2002 |
| JP | 10-063672 A | 3/1998 |

(Continued)

OTHER PUBLICATIONS

Housel, B.. et al., "Web*Express*: A Client/Intercept based System for Optimizing Web Browsing in a Wireless Environment", *Mobile Networks and Applications*, 1998, 3, 419-431, http://portal.scm.org.

(Continued)

*Primary Examiner* — Joshua Joo
(74) *Attorney, Agent, or Firm* — Woodcock Washburn, LLP (57) ABSTRACT

A MIME or XML formatted message is stored and a map is processed in place of a message. The map is a compact representation of the message. The map is indicative of the content and structure of the message. The map comprises tags that map to and are indicative of portions of the message. When a portion of the message is to be accessed, the associated tag in the map is processed to determine the location of the associated portion of the message, and the associated portion of the message is accessed at the location. To allow accurate decryption of signed messages, the format of the message is preserved.

17 Claims, 6 Drawing Sheets

U.S. PATENT DOCUMENTS

| | | | |
|---|---|---|---|
| 2004/0107025 A1* | 6/2004 | Ransom et al. | 700/286 |
| 2004/0240446 A1* | 12/2004 | Compton | 370/389 |
| 2005/0055333 A1* | 3/2005 | Deen et al. | 707/1 |
| 2005/0096025 A1 | 5/2005 | Qumei et al. | 455/418 |
| 2005/0108332 A1* | 5/2005 | Vaschillo et al. | 709/206 |
| 2005/0267937 A1* | 12/2005 | Daniels et al. | 709/206 |
| 2005/0267941 A1* | 12/2005 | Addante et al. | 709/206 |
| 2006/0031264 A1 | 2/2006 | Bosworth et al. | 707/200 |
| 2006/0031357 A1* | 2/2006 | Misra et al. | 709/206 |
| 2006/0047821 A1* | 3/2006 | Kim | 709/227 |
| 2006/0085451 A1* | 4/2006 | Pal et al. | 707/100 |
| 2006/0117073 A1 | 6/2006 | Bosworth et al. | 707/201 |
| 2007/0130262 A1* | 6/2007 | Williams et al. | 709/206 |
| 2007/0233565 A1* | 10/2007 | Herzog et al. | 705/14 |
| 2008/0189373 A1* | 8/2008 | Ikonen et al. | 709/206 |
| 2011/0040840 A1* | 2/2011 | Addante et al. | 709/206 |

FOREIGN PATENT DOCUMENTS

| | | |
|---|---|---|
| JP | 2002108666 | 4/2002 |
| JP | 2004054431 | 2/2004 |
| JP | 2006-178952 A | 7/2006 |
| RU | 2003130270 A | 2/2005 |
| WO | WO 02/01374 A1 | 1/2002 |
| WO | WO 02/073810 A1 | 9/2002 |

OTHER PUBLICATIONS

"Eudora Extended Message Services API", Jul. 19, 1996, Qualcomm Incorporated, 35 pages.

\* cited by examiner

| TAG NAME | LOCATION IN MIME MAP |
|---|---|
| HeaderStart | Before each header section in MIME map |
| LeafBodyStartEnd | Instead of leaf part body of MIME message |
| ChildrenStart | Before opening boundary of MIME map |
| ChildrenEnd | After closing boundary of MIME map |
| Continuation | Anywhere in MIME map |
| Version | Beginning of MIME map |

FORMATTED MESSAGE PROCESSING UTILIZING A MESSAGE MAP

TECHNICAL FIELD

The technical field relates generally to computing systems and more specifically to processing MIME formatted email messages.

BACKGROUND

A popular format for email messages is defined by the Multipurpose Internet Mail Extensions (MIME) standard. The MIME standard allows email to contain multi-part messages. MIME conformant email messages typically contain a header section and a body section. The header includes information regarding the sender, the receiver, a subject line or summary, the time and date that the message was originally sent and other information about the email. The body contains one or more entities, such as message text and file attachments of various types.

In distributed systems, electronic messages are passed from processor to processor in a store and forward manner to deliver the email message. It is not uncommon for email messages to undergo multiple processing steps during the delivery process. Typically, during each processing step, the MIME message (i.e., MIME conformant email message) is modified during this process, the MIME message is parsed, modified, reconstructed, MIME formatted, and passed to the next processing step. The process of parsing, modifying, reconstructing, and formatting can occur several times during a delivery process on a single processor. For example, a message can be virus-scanned, converted from one form to another, header fields can be added, and text disclaimer can be appended to a message text. Also a message can be deferred, if the next processor is not ready to accept responsibility for delivering a message. In such a case the message is stored and re-loaded later. The process of parsing, modifying, reconstructing, and formatting can be time consuming and inefficient.

SUMMARY

This Summary is provided to introduce a selection of concepts in a simplified form that are further described below in the Detailed Description Of Illustrative Embodiments. This Summary is not intended to identify key features or essential features of the claimed subject matter, nor is it intended to be used to limit the scope of the claimed subject matter.

A MIME map is generated that is representative of a MIME formatted email message (MIME message) header and body structure. The MIME map is indicative of the body content of the MIME message. In an example configuration, the MIME map is significantly smaller in size (e.g., less bytes) than the original MIME message. The original MIME message is stored in an appropriate location and the MIME map is processed in place of the MIME message until a portion, or portions, of the MIME message body content is to be accessed. The MIME map comprises tags that map to and are indicative of portions of the MIME message body content. When a portion of the MIME message body content is to be accessed, the associated tags in the MIME map are processed to determine the location of the associated portion of the MIME message, and the associated portion of the MIME message is accessed at the location. In an example embodiment, the format of the MIME message is preserved such that the integrity of the MIME message is maintained to allow accurate decryption of signed MIME messages. In an example embodiment, the message is an XML formatted message and the map is a representation of the XML message.

BRIEF DESCRIPTION OF THE DRAWINGS

The foregoing summary, as well as the following detailed description, is better understood when read in conjunction with the appended drawings. For the purpose of illustrating message processing utilizing a message map, there is shown in the drawings exemplary constructions thereof; however, message processing utilizing a message map is not limited to the specific methods and instrumentalities disclosed.

DETAILED DESCRIPTION OF ILLUSTRATIVE EMBODIMENTS

A message map as described herein is applicable to message having various formats. For example, the message map is applicable to XML formatted message and messages formatted in accordance with the Multipurpose Internet Mail Extensions (MIME) standard. The description herein is directed to MIME maps as applicable to MIME messages. It is to be understood however, that a message map should not be limited to a MIME map as applicable to a MIME message, but is applicable to messages having other formats, such as XML for example.

A MIME map that represents a MIME formatted email message, referred to as a MIME message, is processed in place of the MIME message. The MIME message is stored in original form and the MIME map is generated to include the headers of the message. The MIME map includes additional information, referred to as tags, associated with respective portions of the stored MIME message. Each tag provides an indication of (maps to) a location of the associated portion of the MIME message. In an example embodiment, offsets from the beginning of an original MIME message are used to map the tags of the MIME map to the associated portions of the MIME message. There is no explicit pointer in the map to the stored MIME message, which is stored in a separate file or database field. In an example embodiment, when a MIME map is processed, the processor specifies the location of the MIME map as well as the location of the stored MIME message. The MIME map is processed in place of the MIME message. Utilization of the MIME map provides a mechanism for re-instantiating an in-memory object model that represents the persisted (stored) MIME message in a database, or the like, without parsing and loading the entire MIME message data. Because the MIME map is processed in place of the MIME message, input/output (I/O) database processing is reduced as compared to processing the stored MIME message. Because the MIME map is smaller than the MIME message passing the MIME map in place of the MIME message can result in more efficient system processing and faster delivery time. Further, because the MIME message is not repeatedly parsed and reformatted, utilization of the MIME map provides reduced resource utilization.

When an in-memory representation of a MIME message is modified, the new MIME map is generated and any modified portions of the MIME message body content are stored at appropriate locations and referenced from a new MIME map. In an example embodiment, modified portions of body content are appended to the original MIME message. If, however, the modification is only to the MIME message header, in an example embodiment, only the MIME map is updated. As MIME map that is significantly smaller than a corresponding MIME message saves processing and input/output resources required to save modified MIME message.

A MIME map can be used to reconstruct a modified MIME message without reloading the in-memory MIME object model by merging the MIME map with the original MIME message. During the merge process, tags in MIME map are removed and, when necessary, replaced by appropriate portions of original MIME message.

The MIME map provides a compact representation of the MIME message. The MIME map is formatted to provide a structural view of the content of the stored MIME message. The MIME map is generated by replacing portions of the MIME message with tags. Any appropriate portion of the MIME message can be replaced by a tag. In an example embodiment, portions of the content of the body part of the MIME message are replaced by tags. Each tag provides information allowing access (e.g., retrieval of) to the associated portion of the MIME message. The MIME message can be stored in a separate location from the MIME map, and the tags allow access to MIME message at the separate location.

The MIME map format comprises a combination of MIME formatted information and binary formatted information. In an example embodiment, the MIME map comprises the MIME message with the leaf part body content stripped and replaced with binary entries (i.e., tags) inserted at appropriate insertion points. The tags are used to load and reconstruct the MIME message. The tags also are used to update the MIME map to reflect modifications made to the MIME message. Thus, the MIME map can be updated without requiring parsing of the MIME message.

Figure 1:
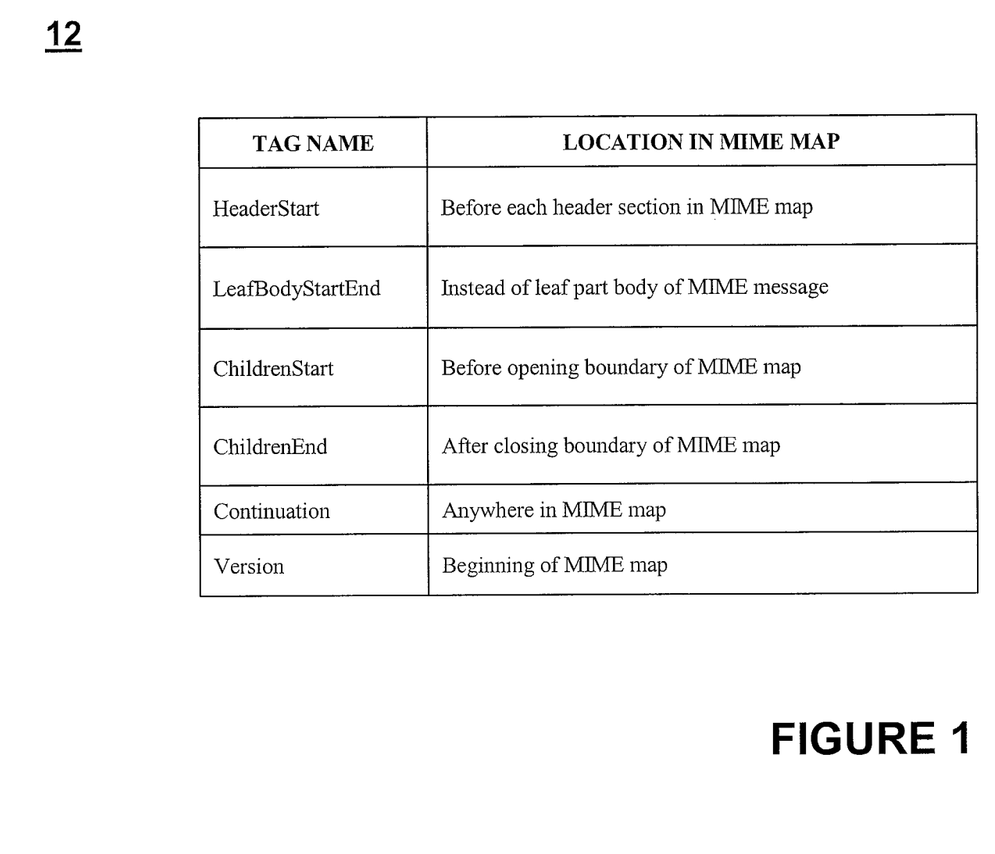
FIG. 1 is a depiction of a table listing example MIME map tag types.

FIG. 1 shows a table 12 listing example MIME map tag types and information associated therewith. In an example embodiment, the MIME map can comprise up to 6 tag types as depicted in table 12. The names of the 6 tag types depicted in table 12 are HeaderStart, LeafBodyStartEnd, ChildrenStart, ChildrenEnd, Continuation, and Version. It is emphasized that the number of tag types, and the assignment of IDs and tag names as depicted in table 12 are examples, and that any appropriate number of tag types, IDs, and tag names can be utilized.

Figure 2:
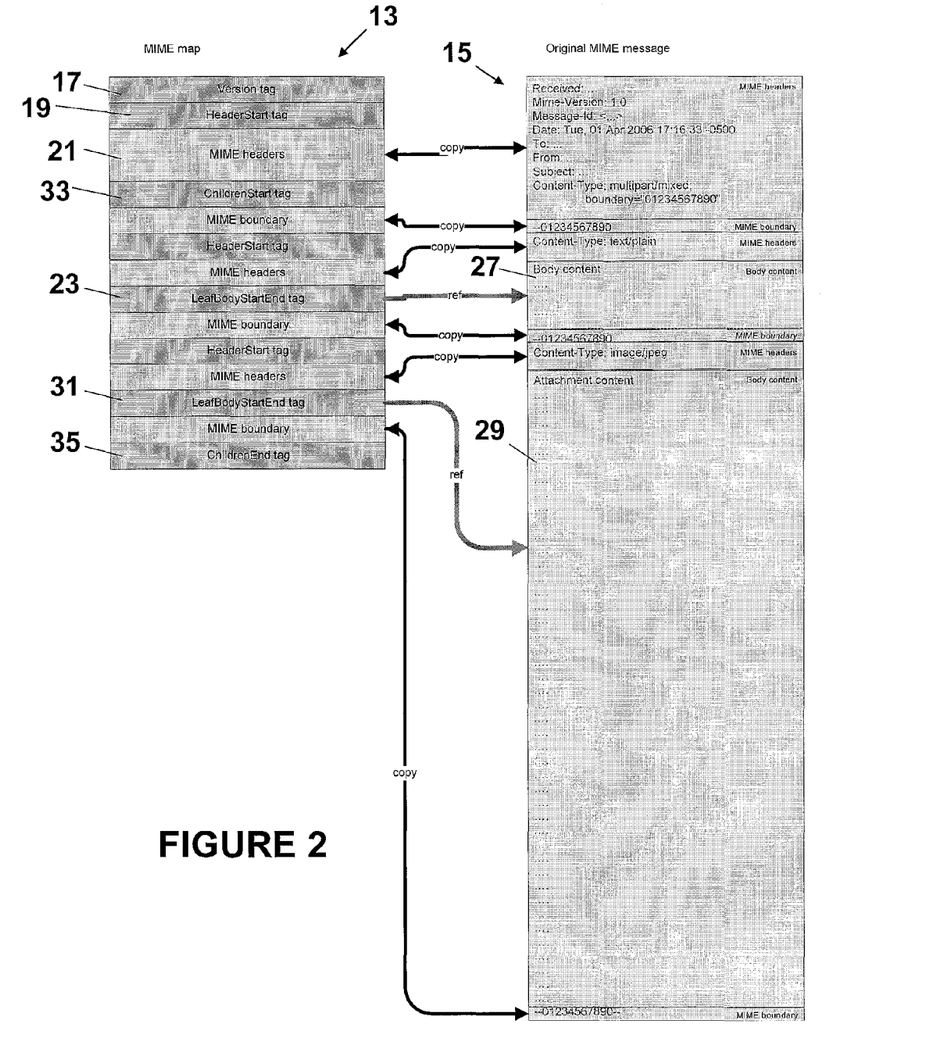
FIG. 2 is a depiction of an example MIME map.

FIG. 2 is a depiction of an example MIME map 13. The MIME map 13 provides a representation of the structure and content of the MIME message 15. In an example embodiment, the MIME map 13 comprises the header of the MIME message and tags associated with various parts of the structured body of the MIME message 15. That is, the MIME map 13 comprises tags indicative of the beginning and end of leaves of the structured content of the MIME message 15, and tags indicative of the beginning and end of children in the structured content of the MIME message 15. In an example embodiment, the first tag in the MIME map is a Version tag type 17. The version tag 17 is located, at the beginning of the MIME map 13. The version tag 17 indicates a version of the MIME map 13 and that the MIME map 13 is a representation of the MIME message 15, rather than the MIME message 15 itself. That is, the Version tag 17 indicates that the MIME map 13 is a MIME map and indicates the version of the MIME map 13. It is envisioned that various versions of MIME map 13 will be generated, and the Version tag 17 is implemented to reflect the version of the MIME map 13. The Version tag 17 facilitates determining compatibility of a MIME map 13 with other software. In an example embodiment, because processing of a document may depend on the version of the document format, the Version tag 17 is at the beginning of the MIME map 13 before any potentially volatile file format elements and to preserve flexibility of changing format element in future.

A Continuation tag can be located anywhere in the MIME map 13 (Continuation tag not shown in FIG. 2). A Continuation tag indicates that no other tags occur within a certain byte count from the tag. The Continuation tag is used to avoid having to buffer a significant amount of MIME data while processing the MIME map. Each header section 21 of the MIME map 13 is preceded by a HeaderStart tag 19. The HeaderStart tag 19 indicates the beginning of an associated header of the MIME message 15. The LeafBodyStartEnd tag is located in the MIME map 13 in place of the body of a leaf part of the MIME message 15. For example, as depicted in FIG. 2, the LeafBodyStartEnd tag 23 is located in the MIME map 13 in place of the body 27 of a leaf part of the MIME message 15, and the LeafBodyStartEnd tag 31 is located in the MIME map 13 in place of the attachment content 29 of the MIME message 15. The LeafBodyStartEnd tag 23, 31 indicates an associated beginning and end of a leaf of the structured content of the MIME message 15.

The ChildrenStart tag 33 indicates the beginning, or opening, of an associated boundary of the structured content of the MIME message 15. As is known in the art, a boundary is a sequence of bytes that serves as body part separator in the MIME format. The ChildrenStart tag 33 is followed (not necessarily contiguously) by a ChildrenEnd tag 35. The ChildrenEnd tag 35 indicates the end, or closing, of a boundary. In an example embodiment, the HeaderStart tag 19 has matching children or leaf closing tags 33, 35 that appear later in the MIME map 13. For example, for a multipart MIME message, the MIME map has both matching ChildrenStart and ChildrenEnd tags and for a leaf part of the MIME message, the MIME map contains a corresponding LeafBodyStartEnd tag. It is to be understood that the placement of tags in the MIME map 13 as depicted herein is exemplary, and should not be limited thereto. For example, a first body tag can reference a portion at the end of the stored MIME message and a second tag can reference a portion closer to the beginning of the stored MIME message.

Figure 3:
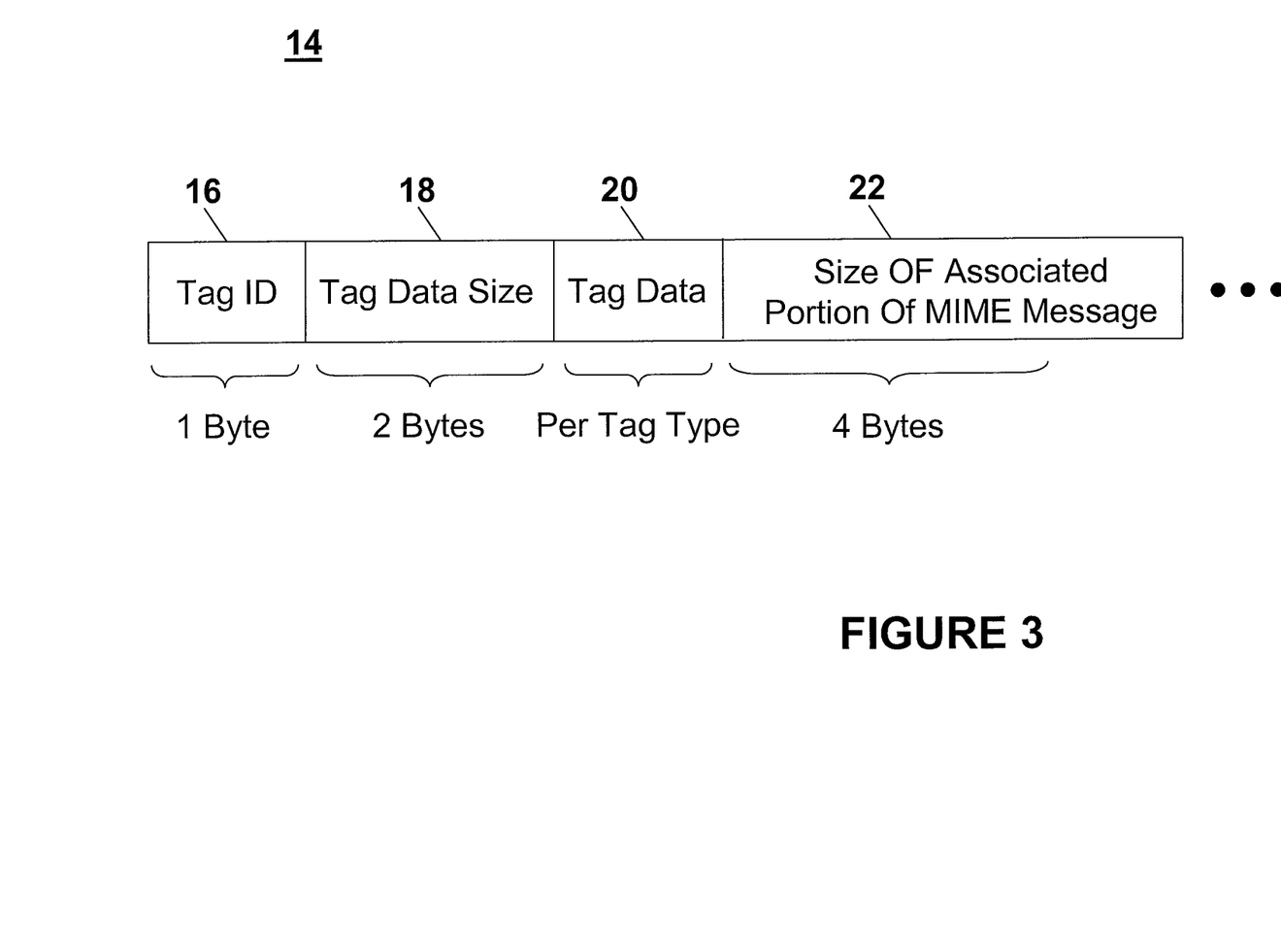
FIG. 3 is an illustration of an example MIME map tags.

FIG. 3 is an illustration of an example MIME map 14 tags. In an example configuration, the MIME map comprises several tags as described above. Each tag starts with a 1-byte tag ID portion 16. The 1-byte tag ID portion 16 is followed by a 2-byte indicator 18 of the size of data contained in the tag. The tag size indicator 18 is followed by the tag data itself 20, which is defined individually for each tag type as described above with respect to table 12. The tag data portion 20 is followed by a 4-byte portion 22 containing the size of the portion of the MIME message associated with the tag. This format is repeated for any additional tags in the MIME map 13.

Figure 4:
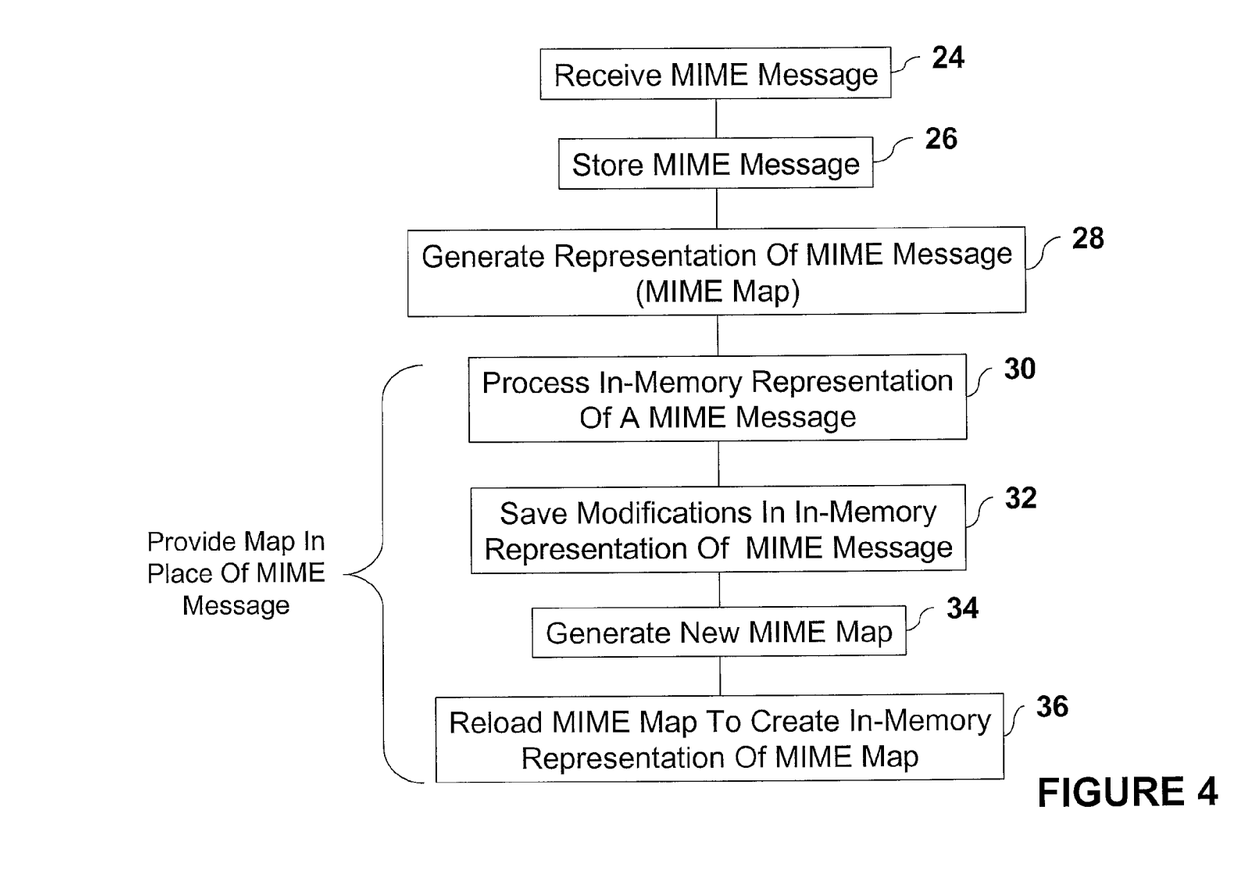
FIG. 4 is a flow diagram of an example process for processing a MIME message utilizing a MIME map.

FIG. 4 is a flow diagram of an example process for processing a MIME message utilizing a MIME map. The MIME message is received at step 24. The MIME message is stored at step 26. The MIME message can be stored at any appropriate locations, such as a database, a server, in local memory, or a combination thereof, for example. The MIME map is generated at step 28. The MIME map represents the MIME message. As described above, the MIME map comprises headers of a MIME message, and an indication of the content and structure of the MIME message. The MIME map comprises tags indicative of associated portions of the MIME message. Upon generation, the MIME map is provided and processed in place of the MIME message. An in-memory MIME object model is processed at step 30. Any modifications to the body content of in-memory MIME object model are saved at step 32. If modifications were made, a new MIME map is generated at step 34. The in-memory MIME object model is reloaded with the new MIME map at step 36. Steps 30, 32, 34, and 36 are repeated as necessary. If the MIME message is updated/modified, the MIME map is accordingly updated/modified to reflect the update/modification in the MIME message. During an update of the MIME message, changed body content is appended to the stored MIME message and additional tags and/or updated offsets are added to the MIME map. If the content of the MIME message is not change, the MIME map as generated is utilized in place of the MIME message. For example, if an attachment is added to the MIME message, the MIME map is modified to include a tag and/or update an offset value, indicative of the added attachment. When the MIME message is to be accessed, the MIME map is used to access the MIME message. For example, upon delivery of the MIME map to an intended recipient of the MIME message, the Version tag is processed; indicating that the received object is a MIME map. The MIME map is processed and the tags and associated offset values are utilized to access (e.g., retrieve) the appropriate portions of the MIME message.

To ensure security, MIME messages optionally are known to be signed. MIME message can also be protected via cryptographic techniques, such as encrypting the MIME message and/or encrypting a hash of the MIME message. The intent is to make the recipient aware of attempts to alter the MIME message. In an example implementation of the MIME map, the format of the MIME message is preserved, when the MIME message is stored, to ensure the integrity of the MIME message. Maintaining the format of the MIME message allows the fidelity of the signed MIME message to be preserved. When the MIME map is generated, tags are generated to accurately reflect the structure of the MIME message. When a MIME message is accessed via the MIME map, the MIME message is accessed such that portions of the MIME message body protected by a signature are not modified in any way that will affect the interpretation of the signed MIME message.

Processing a MIME message utilizing a MIME map provides ability to recreate the MIME message without incurring detrimental performance penalties associated with re-parsing of the original MIME message. For example, this applies to a scenario in which a user of EXCHANGE OUTLOOK WEB ACCESS does not want download an attachment until it is requested. In this example, only the MIME map is provided until the attachment is requested. Another example scenario wherein detrimental performance penalties are mitigating by processing a MIME message utilizing a MIME map is a scenario comprising a transport pipeline wherein transport agents modify the MIME message and the MIME message is persisted to and re-loaded from a database at random points in its lifetime within the system. In this example, the MIME message is persisted (stored) and the MIME map is processed in place of the MIME message. As the MIME message is modified at its storage location, the MIME map is modified via the addition and/or modification of tags and/or offset values to reflect the modifications to the MIME message.

Figure 5:
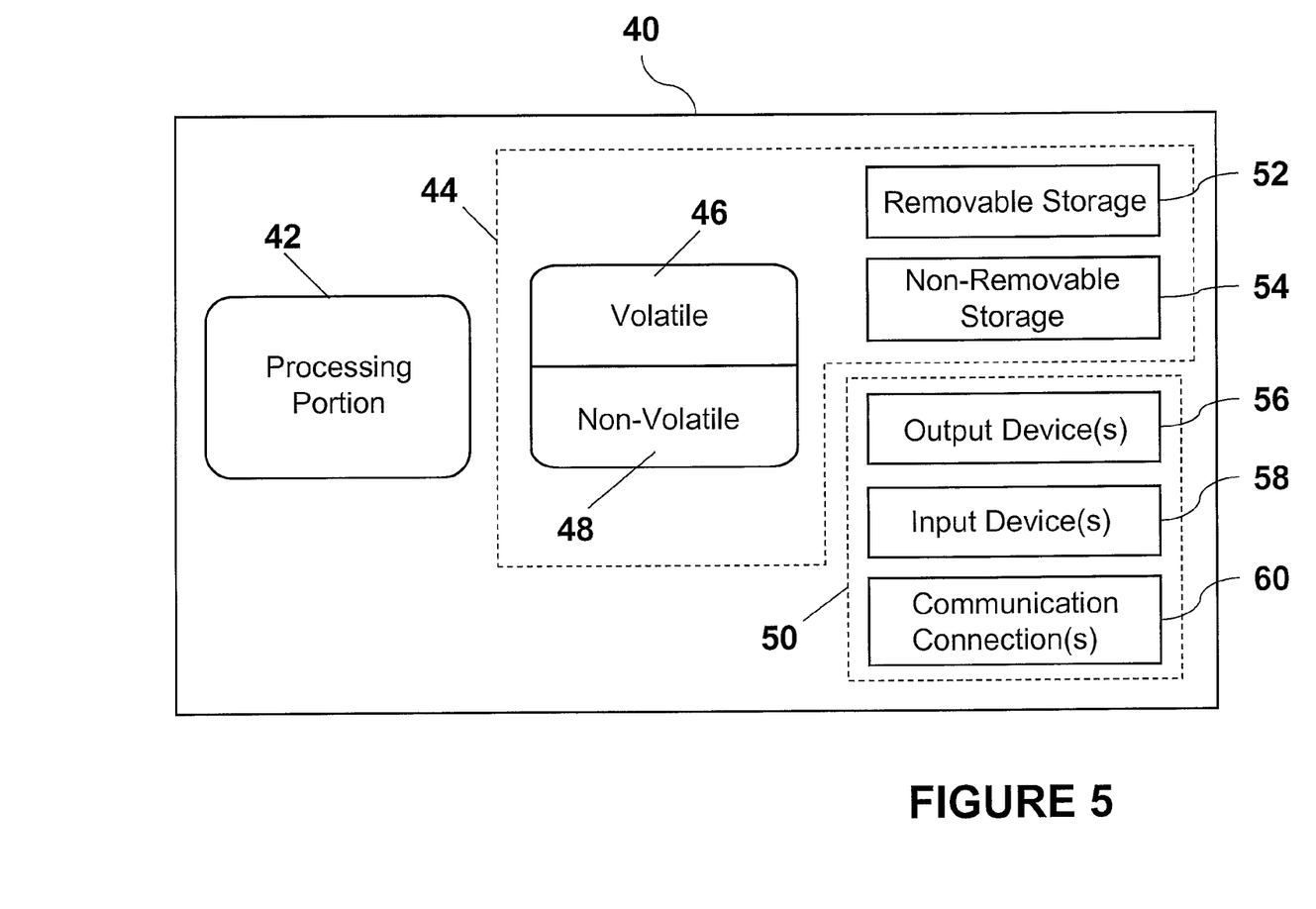
FIG. 5 is a diagram of an exemplary processor for implementing MIME message processing utilizing a MIME map.

FIG. 5 is a diagram of an exemplary processor 40 for implementing MIME message processing utilizing a MIME map. The processor 40 comprises a processing portion 42, a memory portion 44, and an input/output portion 50. The processing portion 42, memory portion 44, and input/output portion 50 are coupled together (coupling not shown in FIG. 5) to allow communications therebetween. The input/output portion 50 is capable of providing and/or receiving components utilized to implement MIME message processing utilizing a MIME map as described above. The input/output portion 50 is capable of providing and/or receiving a MIME message. The input/output portion 50 is capable of providing and/or receiving a MIME map.

The processing portion 42 is capable of implementing MIME message processing utilizing a MIME map as described above. The processing portion 42 also is capable of parsing the MIME message in order to generate the MIME map. The processing portion 42 also is capable of generating the MIME map to be indicative of the content and structure of the MIME message. The processing portion 42 is capable of generating tags associated with respective portions of the MIME message. The processing portion 42 is capable of formatting the MIME map such that the MIME message can be accurately accessed. The processing portion 42 is capable of formatting the MIME map such that the MIME message can be accurately reconstructed, if the MIME message is stored in a distributed database or the like. The processing portion 42 is capable preserving the MIME message such that the integrity of the MIME message is maintained to allow accurate decryption of signed MIME messages.

The processor 40 can be implemented as a client processor and/or a server processor. In a basic configuration, the processor 40 can include at least one processing portion 42 and memory portion 44. Depending upon the exact configuration and type of processor, the memory portion 44 can be volatile (such as RAM) 46, non-volatile (such as ROM, flash memory, etc.) 48, or a combination thereof. The processor 40 can have additional features/functionality. For example, the processor 40 can include additional storage (removable storage 52 and/or non-removable storage 54) including, but not limited to, magnetic or optical disks, tape, flash, smart cards or a combination thereof. Computer storage media, such as memory portion 44, 46, 48, 52, and 54, include volatile and nonvolatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, universal serial bus (USB) compatible memory, smart cards, or any other medium which can be used to store the desired information and which can be accessed by the processor 40. Any such computer storage media can be part of the processor 40.

The processor 40 can also contain communications connection(s) 60 that allow the processor 40 to communicate with other devices. Communications connection(s) 60 is an example of communication media. Communication media typically embody computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media. The processor 40 also can have input device(s) 58 such as keyboard, mouse, pen, voice input device, touch input device, etc. Output device(s) 56 such as a display, speakers, printer, etc. also can be included.

Figure 6:
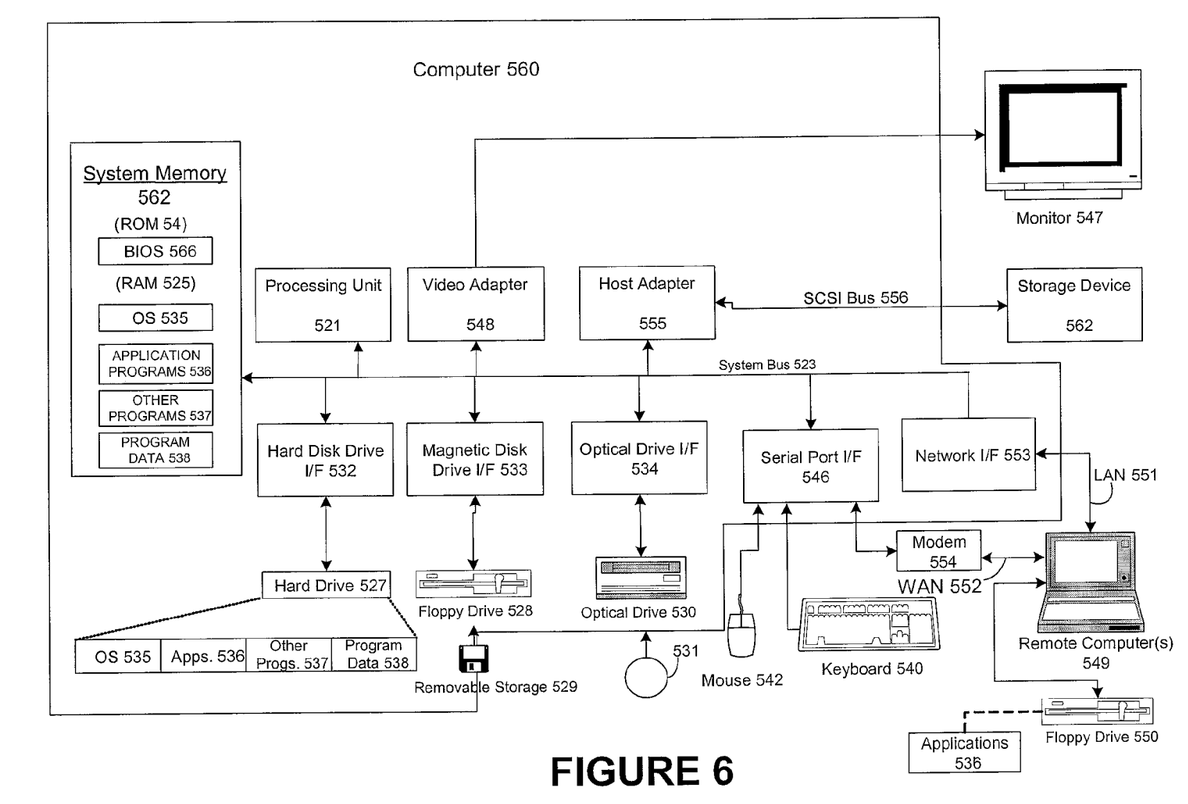
FIG. 6 is a depiction of an example computing environment in which a MIME map can be implemented.

Various embodiments of MIME message processing utilizing a MIME map are executable on a computing device. FIG. 6 and the following discussion provide a brief general description of a suitable computing environment in which such a computing device can be implemented. Although not required, various aspects of a MIME message processing utilizing a MIME map can be described in the general context of computer executable instructions, such as program modules, being executed by a computer, such as a client workstation or a server. Generally, program modules include routines, programs, objects, components, data structures and the like that perform particular tasks or implement particular abstract data types. Moreover, implementation of MIME message processing utilizing a MIME map can be practiced with other computer system configurations, including hand held devices, multi processor systems, microprocessor based or programmable consumer electronics, network PCs, minicomputers, mainframe computers, and the like. Further, MIME message processing utilizing a MIME map also can be practiced in distributed computing environments where tasks are performed by remote processing devices that are linked through a communications network. In a distributed computing environment, program modules can be located in both local and remote memory storage devices.

A computer system can be roughly divided into three component groups: the hardware component, the hardware/software interface system component, and the applications programs component (also referred to as the "user component" or "software component"). In various embodiments of a computer system the hardware component may comprise the central processing unit (CPU) 521, the memory (both ROM 564 and RAM 525), the basic input/output system (BIOS) 566, and various input/output (I/O) devices such as a keyboard 540, a mouse 542, a monitor 547, and/or a printer (not shown), among other things. The hardware component comprises the basic physical infrastructure for the computer system.

The applications programs component comprises various software programs including but not limited to compilers, database systems, word processors, business programs, videogames, and so forth. Application programs provide the means by which computer resources are utilized to solve problems, provide solutions, and process data for various users (machines, other computer systems, and/or end-users). In an example embodiment, application programs perform the functions associated with MIME message processing utilizing a MIME map as described above.

The hardware/software interface system component comprises (and, in some embodiments, may solely consist of) an operating system that itself comprises, in most cases, a shell and a kernel. An "operating system" (OS) is a special program that acts as an intermediary between application programs and computer hardware. The hardware/software interface system component may also comprise a virtual machine manager (VMM), a Common Language Runtime (CLR) or its functional equivalent, a Java Virtual Machine (JVM) or its functional equivalent, or other such software components in the place of or in addition to the operating system in a computer system. A purpose of a hardware/software interface system is to provide an environment in which a user can execute application programs.

The hardware/software interface system is generally loaded into a computer system at startup and thereafter manages all of the application programs in the computer system. The application programs interact with the hardware/software interface system by requesting services via an application program interface (API). Some application programs enable end-users to interact with the hardware/software interface system via a user interface such as a command language or a graphical user interface (GUI).

A hardware/software interface system traditionally performs a variety of services for applications. In a multitasking hardware/software interface system where multiple programs may be running at the same time, the hardware/software interface system determines which applications should run in what order and how much time should be allowed for each application before switching to another application for a turn. The hardware/software interface system also manages the sharing of internal memory among multiple applications, and handles input and output to and from attached hardware devices such as hard disks, printers, and dial-up ports. The hardware/software interface system also sends messages to each application (and, in certain case, to the end-user) regarding the status of operations and any errors that may have occurred. The hardware/software interface system can also offload the management of batch jobs (e.g., printing) so that the initiating application is freed from this work and can resume other processing and/or operations. On computers that can provide parallel processing, a hardware/software interface system also manages dividing a program so that it runs on more than one processor at a time.

A hardware/software interface system shell (referred to as a "shell") is an interactive end-user interface to a hardware/software interface system. (A shell may also be referred to as a "command interpreter" or, in an operating system, as an "operating system shell"). A shell is the outer layer of a hardware/software interface system that is directly accessible by application programs and/or end-users. In contrast to a shell, a kernel is a hardware/software interface system's innermost layer that interacts directly with the hardware components.

As shown in FIG. 6, an exemplary general purpose computing system includes a conventional computing device 560 or the like, including a processing unit 521, a system memory 562, and a system bus 523 that couples various system components including the system memory to the processing unit 521. The system bus 523 may be any of several types of bus structures including a memory bus or memory controller, a peripheral bus, and a local bus using any of a variety of bus architectures. The system memory includes read only memory (ROM) 564 and random access memory (RAM) 525. A basic input/output system 566 (BIOS), containing basic routines that help to transfer information between elements within the computing device 560, such as during start up, is stored in ROM 564. The computing device 560 may further include a hard disk drive 527 for reading from and writing to a hard disk (hard disk not shown), a magnetic disk drive 528 (e.g., floppy drive) for reading from or writing to a removable magnetic disk 529 (e.g., floppy disk, removal storage), and an optical disk drive 530 for reading from or writing to a removable optical disk 531 such as a CD ROM or other optical media. The hard disk drive 527, magnetic disk drive 528, and optical disk drive 530 are connected to the system bus 523 by a hard disk drive interface 532, a magnetic disk drive interface 533, and an optical drive interface 534, respectively. The drives and their associated computer readable media provide non volatile storage of computer readable instructions, data structures, program modules and other data for the computing device 560. Although the exemplary environment described herein employs a hard disk, a removable magnetic disk 529, and a removable optical disk 531, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs), and the like may also be used in the exemplary operating environment. Likewise, the exemplary environment may also include many types of monitoring devices such as heat sensors and security or fire alarm systems, and other sources of information.

A number of program modules can be stored on the hard disk, magnetic disk 529, optical disk 531, ROM 564, or RAM 525, including an operating system 535, one or more application programs 536, other program modules 537, and program data 538. A user may enter commands and information into the computing device 560 through input devices such as a keyboard 540 and pointing device 542 (e.g., mouse). Other input devices (not shown) may include a microphone, joystick, game pad, satellite disk, scanner, or the like. These and other input devices are often connected to the processing unit 521 through a serial port interface 546 that is coupled to the system bus, but may be connected by other interfaces, such as a parallel port, game port, or universal serial bus (USB). A monitor 547 or other type of display device is also connected to the system bus 523 via an interface, such as a video adapter 548. In addition to the monitor 547, computing devices typically include other peripheral output devices (not shown), such as speakers and printers. The exemplary environment of FIG. 6 also includes a host adapter 555, Small Computer System Interface (SCSI) bus 556, and an external storage device 562 connected to the SCSI bus 556.

The computing device 560 may operate in a networked environment using logical connections to one or more remote computers, such as a remote computer 549. The remote computer 549 may be another computing device (e.g., personal computer), a server, a router, a network PC, a peer device, or other common network node, and typically includes many or all of the elements described above relative to the computing device 560, although only a memory storage device 550 (floppy drive) has been illustrated in FIG. 6. The logical connections depicted in FIG. 6 include a local area network (LAN) 551 and a wide area network (WAN) 552. Such networking environments are commonplace in offices, enterprise wide computer networks, intranets and the Internet.

When used in a LAN networking environment, the computing device 560 is connected to the LAN 551 through a network interface or adapter 553. When used in a WAN networking environment, the computing device 560 can include a modem 554 or other means for establishing communications over the wide area network 552, such as the Internet. The modem 554, which may be internal or external, is connected to the system bus 523 via the serial port interface 546. In a networked environment, program modules depicted relative to the computing device 560, or portions thereof, may be stored in the remote memory storage device. It will be appreciated that the network connections shown are exemplary and other means of establishing a communications link between the computers may be used.

While it is envisioned that numerous embodiments of MIME message processing utilizing a MIME map are particularly well-suited for computerized systems, nothing in this document is intended to limit the invention to such embodiments. On the contrary, as used herein the term "computer system" is intended to encompass any and all devices capable of storing and processing information and/or capable of using the stored information to control the behavior or execution of the device itself, regardless of whether such devices are electronic, mechanical, logical, or virtual in nature.

The various techniques described herein can be implemented in connection with hardware or software or, where appropriate, with a combination of both. Thus, the methods and apparatuses for implementing MIME message processing utilizing a MIME map, or certain aspects or portions thereof, can take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for implementing MIME message processing utilizing a MIME map.

The program(s) can be implemented in assembly or machine language, if desired. In any case, the language can be a compiled or interpreted language, and combined with hardware implementations. The methods and apparatuses for implementing MIME message processing utilizing a MIME map also can be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for MIME message processing utilizing a MIME map. When implemented on a general-purpose processor, the program code combines with the processor to provide a unique apparatus that operates to invoke the functionality of MIME message processing utilizing a MIME map. Additionally, any storage techniques used in connection with MIME message processing utilizing a MIME map can invariably be a combination of hardware and software.

While MIME message processing utilizing a MIME map has been described in connection with the example embodiments of the various figures, it is to be understood that other similar embodiments can be used or modifications and additions can be made to the described embodiments for performing the same functions of MIME message processing utilizing a MIME map without deviating therefrom. For example, the concept of the MIME map can be applied to other formats, such as XML. Accordingly, an XML map can be processed in place of an XML message. As described above with respect to a MIME map, an XML map can provide a compact representation of an XML message, and the XML map can contain tags that map to and are indicative of portions of the XML message. Therefore, MIME message processing utilizing a MIME map as described herein should not be limited to any single embodiment, but rather should be construed in breadth and scope in accordance with the appended claims.

What is claimed:
1. A method comprising:
receiving a message;
storing the message in a computer readable storage medium;
generating, by a processor, a message map that is a representation of the stored message, wherein:
generating the message map comprises replacing a portion of the message with a tag, the tag providing information about the replaced portion of the message; and the tag is of a first tag type amongst a plurality of predefined tag types that are available for use in generating the message map;
processing the message map in place of processing the stored message.

2. A method in accordance with claim 1, wherein the message comprises one of:
a multipurpose internet mail extension (MIME) message; and
an XML formatted message.

3. A method in accordance with claim 1, further comprising:
using the tag to access a corresponding portion of the stored message.

4. A method in accordance with claim 1, wherein the tag is indicative of a version of the message map and that the message map is a representation of the received message rather than the message itself.

5. A method in accordance with claim 1, wherein the portion replaced by the tag corresponds to a header of the message.

6. A method in accordance with claim 1, wherein the portion replaced by the tag corresponds to a body portion of the message.

7. A method in accordance with claim 1, wherein the portion replaced by the tag corresponds to at least one of:
a beginning of a body portion of the stored message; and
an end of a body portion of the stored message.

8. A method in accordance with claim 1, wherein the portion replaced by the tag corresponds to at least one of:
a beginning of a child portion of the stored message; and
an end of a child portion of the stored message.

9. A method in accordance with claim 1, wherein storing the message comprises maintaining a format of the message.

10. A system comprising:
an input/output portion configured to:
receive a message, the message comprising at least one of a multipurpose internet mail extension (MIME) message or an XML formatted message;
a memory portion configured to store the message; and
a processing portion configured to generate a message map that is a representation of the stored message, wherein:
generating the message map comprises replacing a portion of the message with at least one tag, the at least one tag providing information about the replaced portion of the message; and
the at least one tag is one of a plurality of predefined tag types.

11. A system in accordance with claim 10, wherein the at least one tag is indicative of a version of the message map.

12. A system in accordance with claim 10, wherein the portion replaced by the at least one tag corresponds to a header of the message.

13. A system in accordance with claim 1, wherein the portion replaced by the at least one tag corresponds to a body portion of the message.

14. A system in accordance with claim 10, wherein the portion replaced by the at least one tag corresponds to at least one of:
a beginning of a body portion of the stored message; and
an end of a body portion of the stored message.

15. A system in accordance with claim 10, wherein the portion replaced by the at least one tag corresponds to at least one of:
a beginning of a child portion of the stored message; and
an end of a child portion of the stored message.

16. A system in accordance with claim 10, wherein the message is stored so as to maintain a format of the message.

17. A computer-readable memory comprising computer-executable instructions that are executable by a computer to perform acts for processing at least one of a multipurpose internet mail extension (MIME) message or an XML formatted message, the acts comprising:
receiving the message;
storing the message;
generating a message map that is a representation of the message, wherein generating the message map comprises replacing a header of the message with a tag, the tag providing information about the replaced header of the message; and
processing the message map in place of processing the stored message.

* * * * *